US010392020B2

(12) United States Patent
Komatsu et al.

(10) Patent No.: US 10,392,020 B2
(45) Date of Patent: Aug. 27, 2019

(54) BICYCLE COMPONENT CONTROL SYSTEM

(71) Applicant: Shimano Inc., Sakai, Osaka (JP)

(72) Inventors: Atsushi Komatsu, Osaka (JP); Shingo Sakurai, Osaka (JP); Yuta Kurokawa, Osaka (JP)

(73) Assignee: Shimano Inc., Osaka (JP)

( * ) Notice: Subject to any disclaimer, the term of this patent is extended or adjusted under 35 U.S.C. 154(b) by 243 days.

(21) Appl. No.: 15/644,375

(22) Filed: Jul. 7, 2017

(65) Prior Publication Data

US 2019/0009780 A1 Jan. 10, 2019

(51) Int. Cl.

| | |
|---|---|
| ***B60W 30/182*** | (2012.01) |
| ***B62J 1/08*** | (2006.01) |
| ***B62K 25/04*** | (2006.01) |
| ***B62M 25/08*** | (2006.01) |
| ***B60W 10/22*** | (2006.01) |
| ***B60W 10/30*** | (2006.01) |
| ***B60W 10/11*** | (2012.01) |
| ***B60W 50/08*** | (2012.01) |
| *B62J 99/00* | (2009.01) |

(52) U.S. Cl.

CPC .......... *B60W 30/182* (2013.01); *B60W 10/11* (2013.01); *B60W 10/22* (2013.01); *B60W 10/30* (2013.01); *B60W 50/082* (2013.01); *B62J 1/08* (2013.01); *B62K 25/04* (2013.01); *B62M 25/08* (2013.01); *B60W 2510/1005* (2013.01); *B60W 2550/142* (2013.01); *B60W 2710/1005* (2013.01); *B60W 2710/226* (2013.01); *B60W 2710/30* (2013.01); *B62J 2001/085* (2013.01); *B62J 2099/002* (2013.01); *B62J 2099/004* (2013.01); *B62K 2025/045* (2013.01)

(58) Field of Classification Search

None

See application file for complete search history.

(56) References Cited

U.S. PATENT DOCUMENTS

| | | | |
|---|---|---|---|
| 7,083,180 | B2 | 8/2006 | Turner |
| 8,091,910 | B2 | 1/2012 | Hara et al. |
| 8,429,061 | B2 | 4/2013 | Shirai |
| 8,458,080 | B2 | 6/2013 | Shirai |
| 8,550,551 | B2 | 10/2013 | Shirai |
| 8,655,548 | B2 | 2/2014 | Ichida et al. |
| 8,833,848 | B2 | 9/2014 | Shirai |
| 9,157,523 | B2 | 10/2015 | Miki et al. |
| 9,302,739 | B2 | 4/2016 | Shirai |
| 9,511,809 | B2 | 12/2016 | Kodama et al. |
| 9,561,734 | B2 | 2/2017 | Watarai et al. |

(Continued)

*Primary Examiner* — Richard M Camby

(74) *Attorney, Agent, or Firm* — Global IP Counselors, LLP

(57) ABSTRACT

A bicycle component control system is basically provided with an electronic controller. The electronic controller is configured to output a control signal to operate both of a first bicycle electric component and a second bicycle electric component in accordance with a correspondence table between an operating state of the first bicycle electric component and an operating state of the second bicycle electric component. The first bicycle electric component includes one of a height adjustable seatpost and a suspension. The second bicycle electric component includes one of a gear transmission and the other of the height adjustable seatpost and the suspension.

13 Claims, 9 Drawing Sheets

(56) References Cited

U.S. PATENT DOCUMENTS

| | | | | |
|---|---|---|---|---|
| 2006/0225942 | A1 * | 10/2006 | Weagle .................... | B62K 5/00 180/357 |
| 2016/0280330 | A1 | 9/2016 | Hara | |

* cited by examiner

| INPUTS | | FIRST ELECTRIC BICYCLE COMPONENT | | SECOND ELECTRIC BICYCLE COMPONENT |
|---|---|---|---|---|
| HIGH GEAR RATIO | | SUSPENSION DAMPING | SUSPENSION STROKE | ASP HEIGHT |
| ROAD CONDITION (SLOPE) | ASCENT | LOCK | SHORT | HIGH |
| | DESCENT | OPEN | LONG | LOW |
| | TRAIL (FLAT) | OPEN | LONG | HIGH |

FIG. 6

| INPUTS | | FIRST ELECTRIC BICYCLE COMPONENT | | SECOND ELECTRIC BICYCLE COMPONENT |
|---|---|---|---|---|
| LOW GEAR RATIO | | SUSPENSION DAMPING | SUSPENSION STROKE | ASP HEIGHT |
| ROAD CONDITION (SLOPE) | ASCENT | LOCK | SHORT | HIGH |
| | DESCENT | OPEN | LONG | LOW |
| | TRAIL (FLAT) | MIDDLE | SHORT | HIGH |

FIG. 7

| INPUT | | FIRST ELECTRIC BICYCLE COMPONENT | | SECOND ELECTRIC BICYCLE COMPONENT |
|---|---|---|---|---|
| | | SUSPENSION DAMPING | SUSPENSION STROKE | GEAR TRANSMISSION'S GEAR RATIO |
| ROAD CONDITION (SLOPE) | ASCENT | LOCK | SHORT | LOW |
| | DESCENT | OPEN | LONG | HIGH/MIDDLE |
| | TRAIL (FLAT) | OPEN | LONG | HIGH/MIDDLE |

FIG. 8

| INPUT | | FIRST ELECTRIC BICYCLE COMPONENT | SECOND ELECTRIC BICYCLE COMPONENT |
|---|---|---|---|
| | | ASP HEIGHT | GEAR TRANSMISSION'S GEAR RATIO |
| ROAD CONDITION (SLOPE) | ASCENT | HIGH | LOW |
| | DESCENT | LOW | HIGH/MIDDLE |
| | TRAIL (FLAT) | HIGH | HIGH/MIDDLE |

FIG. 9

| INPUT | | FIRST ELECTRIC BICYCLE COMPONENT | | SECOND ELECTRIC BICYCLE COMPONENT | THIRD ELECTRIC BICYCLE COMPONENT |
|---|---|---|---|---|---|
| | | SUSPENSION | | ASP HEIGHT | GEAR TRANSMISSION'S GEAR RATIO |
| | | DAMPING | STROKE | | |
| ROAD CONDITION (SLOPE) | ASCENT | LOCK | SHORT | HIGH | LOW |
| | DESCENT | OPEN | LONG | LOW | HIGH/MIDDLE |
| | TRAIL (FLAT) | OPEN | LONG | HIGH | HIGH/MIDDLE |

FIG. 10

BICYCLE COMPONENT CONTROL SYSTEM

BACKGROUND

Field of the Invention

This invention generally relates to a bicycle component control system. More specifically, the present invention relates to a bicycle component control system that includes preset combinations of operating state for at least two bicycle electric components.

Background Information

In recent years, some bicycles are provided with bicycle electric components or devices to make the ride more comfortable. Examples of some these bicycle electric components include suspensions, derailleurs and seatposts. Often these bicycle electric components are provided with an electric unit that includes such parts as an actuator or other drive device for changing an operating state of the bicycle electric components. Typically, one or more operating devices are provided on the bicycle for a rider to individually change an operating condition of the bicycle electric components to the rider's preference for a particular riding condition.

SUMMARY

Generally, the present disclosure is directed to various features of a bicycle component control system. In one feature, a bicycle component control system is provided in which operating states of first and second bicycle electric components are changes in accordance with a correspondence table between the operating states of the first and second bicycle electric components.

In view of the state of the known technology and in accordance with a first aspect of the present disclosure, a bicycle component control system is provided that basically comprises an electronic controller. The electronic controller is configured to output a control signal to operate both of a first bicycle electric component and a second bicycle electric component in accordance with a correspondence table between an operating state of the first bicycle electric component and an operating state of the second bicycle electric component. The first bicycle electric component includes one of a height adjustable seatpost and a suspension. The second bicycle electric component includes one of a gear transmission and the other of the height adjustable seatpost and the suspension.

With the bicycle component control system according to the first aspect, it is possible to provide a bicycle component control system that simultaneously controls suitable operating states of a plurality of electric components including a bicycle telescopic apparatus such as a height adjustable seatpost or a suspension. It is also possible to operate the electric components via one control device that inputs a command to control the system.

In accordance with a second aspect of the present invention, the bicycle component control system according to the first aspect is configured so that the first bicycle electric component includes the suspension and the second bicycle electric component includes the height adjustable seatpost, and the correspondence table includes at least one of a travel stroke and a damping condition of the suspension, and a plurality of height positions of the height adjustable seatpost.

With the bicycle component control system according to the second aspect, it is possible to provide a bicycle component control system that simultaneously controls suitable operating states of a height adjustable seatpost and a suspension.

In accordance with a third aspect of the present invention, the bicycle component control system according to the second aspect is configured so that the electronic controller outputs the control signal in response to receiving an input indicative of a road condition.

With the bicycle component control system according to the third aspect, it is possible to simultaneously control suitable operating states of a height adjustable seatpost and a suspension in accordance with a current road condition during riding.

In accordance with a fourth aspect of the present invention, the bicycle component control system according to the third aspect is configured so that the electronic controller is configured to receive the input via a manual input from a user.

With the bicycle component control system according to the fourth aspect, it is possible for a user to simultaneously control a height adjustable seatpost and a suspension in accordance with the rider's own judgment of a road condition In accordance with a fifth aspect of the present invention, the bicycle component control system according to the third or fourth aspect is configured so that the electronic controller is configured to receive the input from a road condition detector.

With the bicycle component control system according to the fifth aspect, it is possible to simultaneously and automatically control a height adjustable seatpost and a suspension to be suitable states in accordance with a road condition.

In accordance with a sixth aspect of the present invention, the bicycle component control system according to any one of the third to fifth aspects is configured so that the electronic controller is configured to output the control signal to change the height position of the height adjustable seatpost to a high position and to change the damping condition of the suspension to be firm state in response to receiving the input indicative of an ascending road condition.

With the bicycle component control system according to the sixth aspect, it is possible to easily provide suitable operating states for both a height adjustable seatpost and a suspension for an ascending road condition.

In accordance with a seventh aspect of the present invention, the bicycle component control system according to any one of the third to sixth aspects is configured so that the electronic controller is configured to output the control signal to change the height position of the height adjustable seatpost to a low position and to change the damping condition of the suspension to be open state in response to receiving the input indicative of a descending road condition.

With the bicycle component control system according to the seventh aspect, it is possible to easily provide suitable operating states for both a height adjustable seatpost and a suspension for an descending road condition.

In accordance with an eighth aspect of the present invention, the bicycle component control system according to any one of the first to seventh aspects is configured so that the electronic controller is configured to change the correspondence table to control the first bicycle electric component and the second bicycle electric component in accordance with a current gear ratio at a time of receiving the input.

With the bicycle component control system according to the eighth aspect, it is possible to easily provide suitable operating states of a plurality of electric components in accordance with a road condition and a current gear ratio that implies supplemental information to judge a more precise road condition during riding.

In accordance with a ninth aspect of the present invention, the bicycle component control system according to any one of the first to eighth aspects is configured so that the electronic controller is configured to output the least one control signal to operate the height adjustable seatpost, the suspension and the gear transmission in accordance with the correspondence table.

With the bicycle component control system according to the ninth aspect, it is possible to provide a bicycle component control system that simultaneously controls suitable operating states of three bicycle electric components In accordance with a tenth aspect of the present invention, the bicycle component control system according to any one of the first to ninth aspects is configured so that the electronic controller is configured to set a multiple device control mode in which the electronic controller outputs the least one control signal in accordance with the correspondence table and a manual control mode in which the electronic controller outputs a control signal in response to a separate input to control one of the bicycle telescopic apparatus and the first bicycle electric component.

With the bicycle component control system according to the tenth aspect, it is possible to provide a multiple device control mode and a manual control mode according to a user's need.

In accordance with an eleventh aspect of the present invention, the bicycle component control system according to any one of the first to tenth aspects is configured so that the control signal includes a first control signal to control the first bicycle electric component and a second control signal to control the second bicycle electric component, and the electronic controller is configured to output the first control signal and the second control signal with a time lag therebetween.

With the bicycle component control system according to the eleventh aspect, it is possible to avoid concurrent movement of the first and second bicycle electric components to prevent a shock due to sudden change of operating states of multiple bicycle electric components.

In accordance with a twelfth aspect of the present invention, the bicycle component control system according to any one of the first to eleventh aspects is configured so that the electronic controller is configured to set a setting mode in which a user can set at least one setting of the correspondence table.

With the bicycle component control system according to the twelfth aspect, it is possible to provide a selectable table in which a user can select a value of table to meet a demand of a user.

In accordance with a thirteenth aspect of the present invention, the bicycle component control system according to any one of the first to twelfth aspects is configured so that the electronic controller is configured to output the control signal via a wireless transmitter.

With the bicycle component control system according to the thirteenth aspect, it is possible to control a plurality of bicycle electric components without connecting the bicycle electric components to an electronic controller via electrical cables.

Also, other objects, features, aspects and advantages of the disclosed bicycle component control system will become apparent to those skilled in the art from the following detailed description, which, taken in conjunction with the annexed drawings, discloses preferred embodiments of the bicycle component control system.

BRIEF DESCRIPTION OF THE DRAWINGS

Referring now to the attached drawings which form a part of this original disclosure:

FIG. 6 is a first (high gear ratio) correspondence table that is used to set operating states of first and second bicycle electric components for a particular road condition;

FIG. 7 is a second (low gear ratio) correspondence table that is used to set operating states of first and second bicycle electric components for a particular road condition:

FIG. 8 is a third (all-purpose) correspondence table that is used to set operating states of first and second bicycle electric components for a particular road condition;

FIG. 9 is a fourth (all-purpose) correspondence table that is used to set operating states of first and second bicycle electric components for a particular road condition;

FIG. 10 is a fifth (all-purpose) correspondence table between an operating state of a first bicycle electric component, an operating state of a second bicycle electric component and an operating state of a third bicycle electric component for a particular road condition;

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
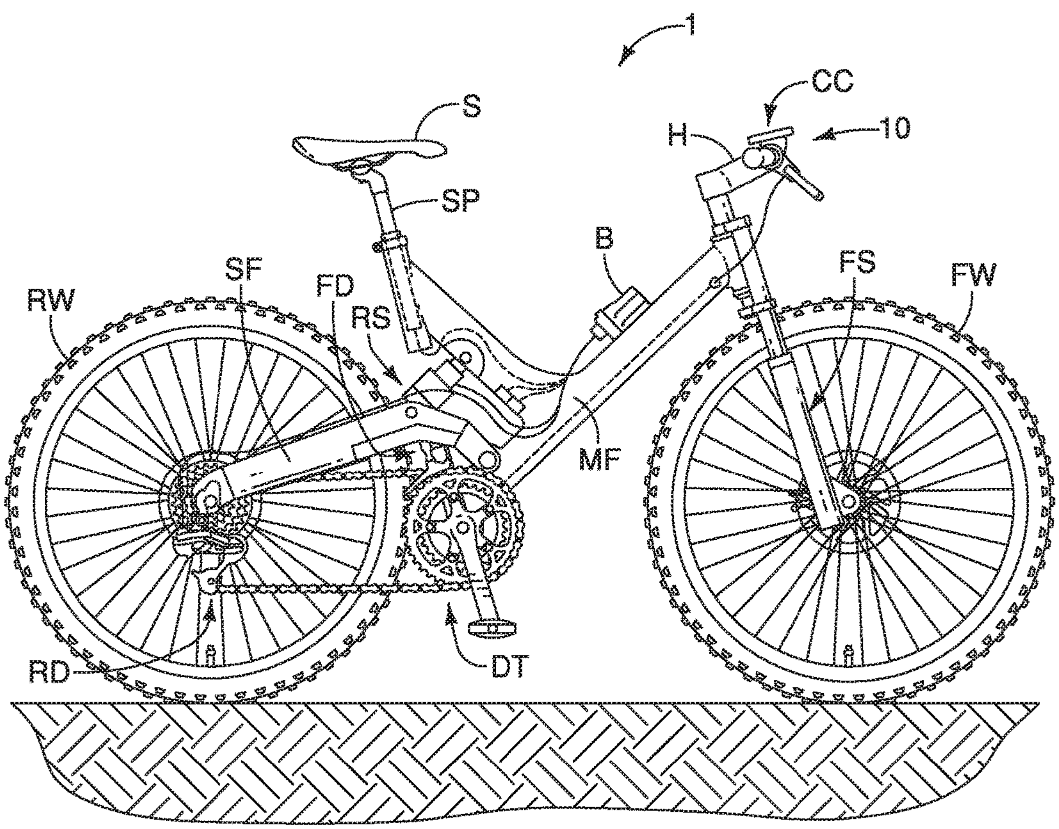
FIG. 1 is a side elevational view of a bicycle that is equipped with a bicycle component control system in accordance with one illustrated embodiment.
Figure 2:
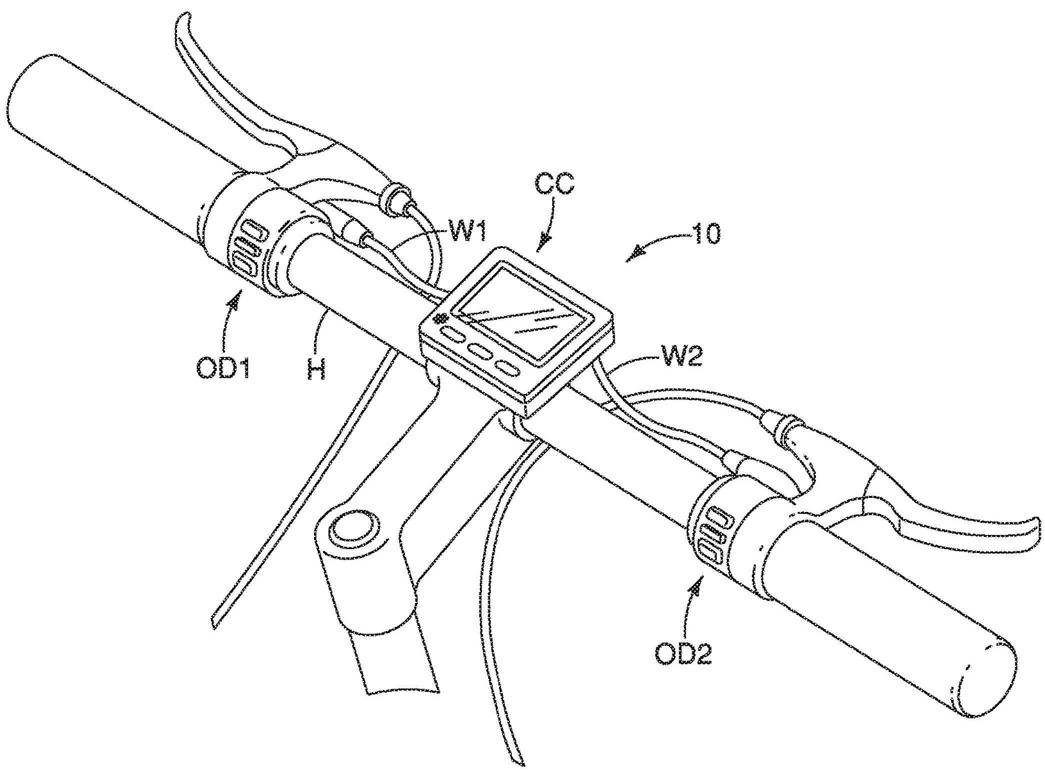
FIG. 2 is a perspective view of a handlebar area of the bicycle illustrated in FIG. 1.
Figure 3:
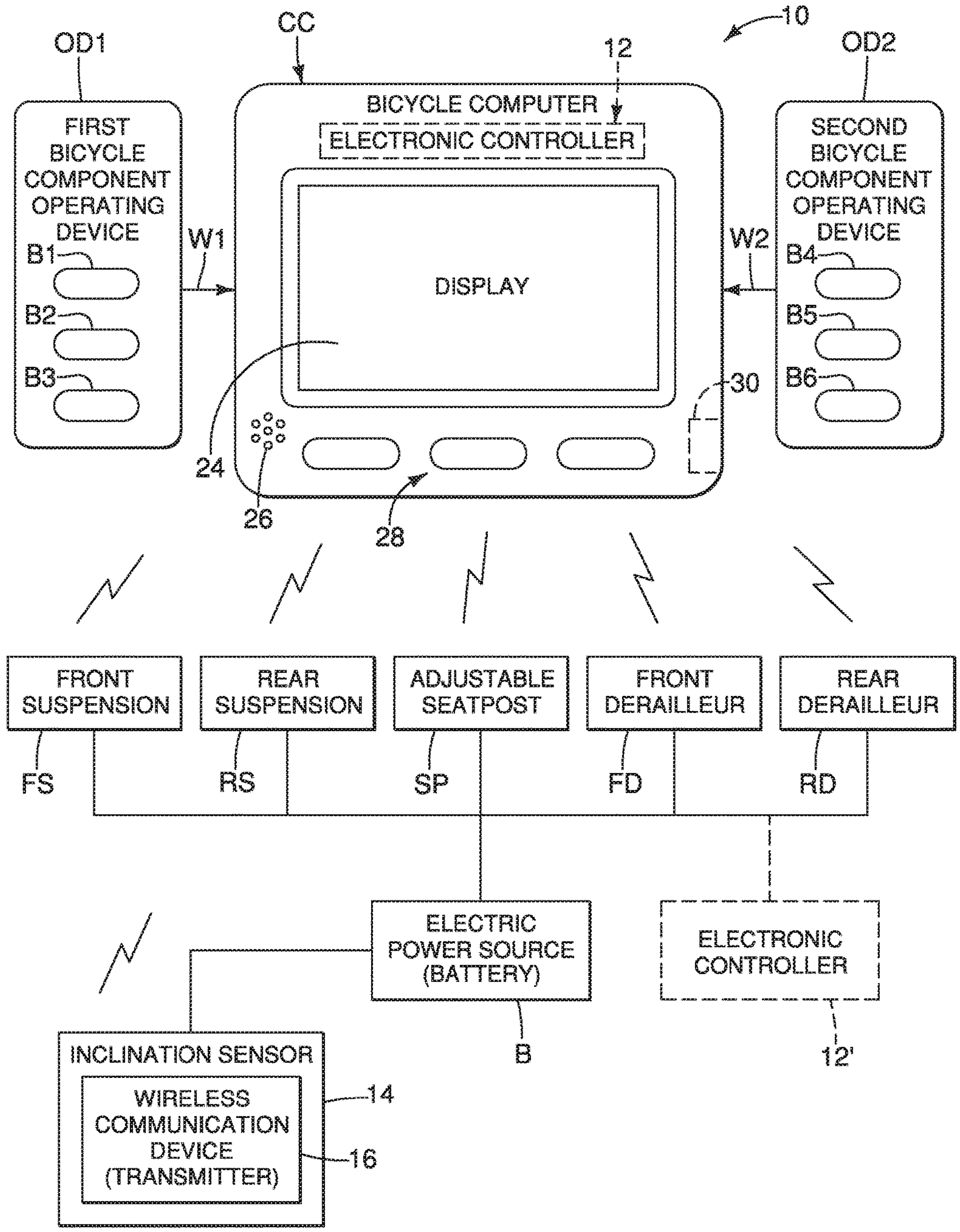
FIG. 3 is a schematic block diagram showing an entire configuration of the bicycle component control system.

Referring initially to FIGS. 1 to 3, a bicycle 1 is illustrated that is equipped with a bicycle electric component system 10 in accordance with a first embodiment. While the bicycle 1 is illustrated as a mountain bicycle, the bicycle electric component system 10 can be used with other styles of bicycles. The bicycle electric component system 10 is configured to control the operations of various electrical bicycle components as discussed below.

In the illustrated embodiment of FIGS. 1 and 2, the bicycle 1 includes, among other things, a handlebar H, a main bicycle frame MF, a sub-bicycle frame SF, a bicycle seat S, a front wheel FW, a rear wheel RW and a drive train DT. The drive train DT is configured to convert the rider's pedaling force into driving force. The bicycle 1 further includes other electric components that form a part of the bicycle electric component system 10. Specifically, the bicycle electric component system 10 comprises a bicycle computer CC, a height adjustable seatpost SP, a front suspension FS, a rear suspension RS, an electric front derailleur FD and an electric rear derailleur RD. The electric front derailleur FD and the electric rear derailleur RD collectively form a gear transmission. Alternatively, the electric front derailleur FD and/or the electric rear derailleur RD can be substituted with other transmissions such as an internal-hub transmission.

The bicycle computer CC, the height adjustable seatpost SP, the front suspension FS, the rear suspension RS, the electric front derailleur FD and the electric rear derailleur RD are each bicycle components. Thus, the bicycle computer CC, the height adjustable seatpost SP, the front suspension FS, the rear suspension RS, the electric front derailleur FD and the electric rear derailleur RD can be collectively referred to as the bicycle components CC, SP, FS, RS, FD and RD. The height adjustable seatpost SP, the front suspension FS and the rear suspension RS are examples of a bicycle telescopic apparatus. Each of the height adjustable seatpost SP, the front suspension FS, the rear suspension RS, the electric front derailleur FD and the electric rear derailleur RD can be considered as a "first electric bicycle component". Likewise, each of the height adjustable seatpost SP, the front suspension FS, the rear suspension RS, the electric front derailleur FD and the electric rear derailleur RD can be considered as a "second electric bicycle component". It will be understood that the terms "first" and "second" can be used interchangeably to describe the height adjustable seatpost SP, the front suspension FS, the rear suspension RS, the electric front derailleur FD and the electric rear derailleur RD.

As seen in FIGS. 2 and 3, the bicycle 1 is provided with a first bicycle component operating device OD1 and a second bicycle component operating device OD2 for selectively operating these bicycle components are operating, adjusting and/or changing by the bicycle components CC, SP. FS, RS. FD and RD. In other words, the first and second bicycle component operating devices OD1 and OD2 can be set by the user or rider to operate, adjust and/or change one or more of the bicycle components CC, SP, FS, RS, FD and RD. For example, the first and second bicycle component operating devices OD1 and OD2 can be set to normally operate the electric front derailleur FD and the electric rear derailleur RD, respectively. However, through one or more operations, the user or rider can temporarily change the first and second bicycle component operating devices OD1 and OD2 such that they can operate, adjust and/or change the front suspension FS and the rear suspension RS, respectively. Likewise, the user or rider can temporarily change one of the first and second bicycle component operating devices OD1 and OD2 such that it can operate, adjust and/or change the height adjustable seatpost SP.

Figure 4:
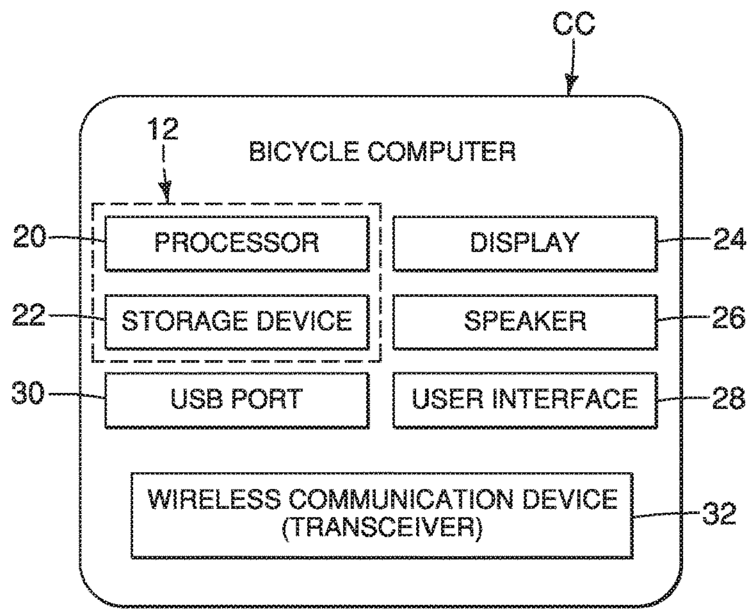
FIG. 4 is a schematic block diagram showing a basic configuration of a bicycle computer of the bicycle component control system.

Basically, as seen in FIGS. 3 and 4, the bicycle component control system 10 comprises an electronic controller 12. Here, in the illustrated embodiment, the electronic controller 12 is a part of the bicycle computer CC. The electronic controller 12 is configured to control the bicycle electric components SP, FS, RS, FD and RD in response to inputs from either the first and second bicycle component operating devices OD1 and OD2 or other sensors that indicate a particular riding condition.

For example, in the illustrated embodiment, the bicycle component control system 10 further comprises an inclination sensor 14 that is provided on the bicycle 1 such as on the main bicycle frame MF as seen in FIG. 1. The term "inclination sensor" 14 as used herein a device that can measure a tilt or inclination of the bicycle 1 in a fore to aft direction of the bicycle 1. For example, the inclination sensor 14 can be an accelerometer, an inclinometer, a tiltmeter, etc. Here, the inclination sensor 14 is equipped with a wireless communication device 16. The term "wireless communication device" as used herein includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. The wireless communication signals can be radio frequency (RF) signals, ultra-wide band communication signals, or Bluetooth communications or any other type of signal suitable for wireless communications as understood in the bicycle field. Here, the wireless communication device 16 can be a one-way wireless communication unit such as a transmitter. As mentioned below, the inclination sensor 14 can be omitted and the user can manually input a command in accordance with a road condition, e.g. the slope of the road using one of the first and second bicycle component operating devices OD1 and OD2.

As seen in FIG. 4, the electronic controller 12 is preferably a microcomputer that includes one or more processor 20 and one or more storage device 22 (i.e., a computer memory device). The storage device 22 can be any a non-transitory computer readable medium such as a ROM (Read Only Memory) device, a RAM (Random Access Memory) device, a hard disk, a flash drive, etc. The storage device 22 is configured to store settings, programs, data, calculations and/or results of the processor(s) 20.

As seen in FIGS. 2 and 3, the bicycle computer CC further includes a display 24, a speaker 26 and a user interface 28. Here, the user interface 28 is, for example, one or more buttons that a user can operate to change various parameters or settings used by the control programs of the electronic controller 12. The bicycle computer CC is further provided with a USB port 30 for a user to hook up an external device such as a tablet, a smartphone, a laptop computer, a desktop computer, etc. The display 24, the speaker 26 and the user interface 28 can be omitted if needed and/or desired.

As seen in FIGS. 3 and 4, the electronic controller 12 is configured to communicate with the bicycle electric components SP, FS, RS, FD and RD via wireless communications. In particular, the bicycle computer CC further includes a wireless communication device 32 that transmits and receives wireless communications to and from the electronic controller 12. Here, the wireless communication device 32 is a two-way wireless communication unit such a transceiver or a transmitter-receiver. In this way, the electronic controller 12 is configured to output the control signal via a wireless transmitter. The first and second bicycle component operating devices OD1 and OD2 can be connected to the electronic controller 12 by wires W1 and W2 as shown in FIGS. 2 and 3, or can wireless communicate wirelessly with the electronic controller 12. Alternatively, the electronic controller 12 and the wireless communication device 32 can be integrated into the one of the first and second bicycle component operating devices OD1 and OD2. In such a configuration, the bicycle computer CC can be omitted. The wireless communication device 32 is one example of a communication interface for communicating with the bicycle electric components SP, FS, RS, FD and RD. However, the electronic controller 12 and each of the bicycle electric components SP, FS, RS, FD and RD can have power line communications (PLC) interface for communicating via power lines.

Also, as shown in FIG. 3, the electronic controller 12 can be replaced with an electronic controller 12' (shown in dashed lines in FIG. 3) which is electrically wired to the bicycle electric components SP, FS, RS, FD and RD and the battery B. In this way, the electronic controller 12' can communicate with the bicycle electric components SP, FS. RS, FD and RD using power line communications (PLC) such as used in the Di2 electrical components sold by Shimano Inc. Moreover, while the electronic controller 12' is shown as a separate unit from each of the bicycle electric components SP, FS, RS, FD and RD, the electronic controller 12' can be integrated into one of the bicycle electric components SP. FS, RS, FD and RD.

Figure 5:
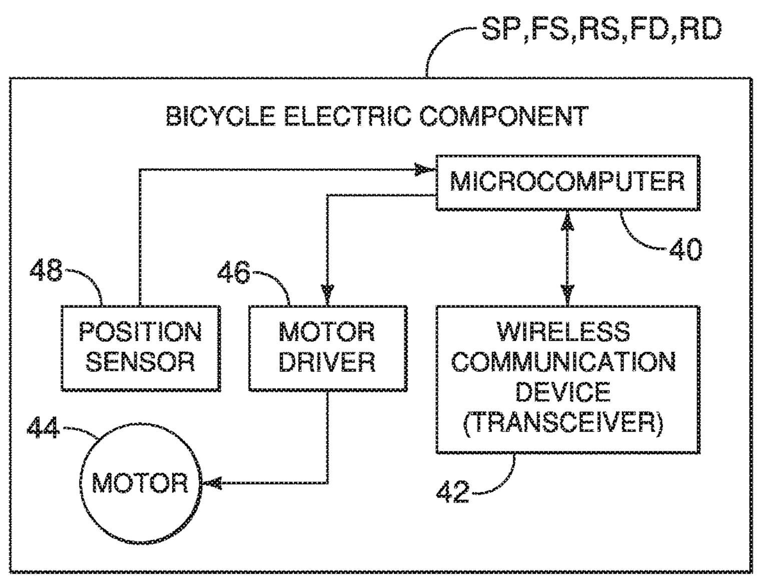
FIG. 5 is a schematic block diagram showing a basic configuration of each bicycle component of the bicycle component control system that is operated based on signals or commands from the bicycle computer of the bicycle component control system.

As seen in FIG. 5, each of the bicycle electric components SP, FS, RS, FD and RD basically includes a microcomputer 40, a two-way wireless communication device 42, a motor 44, a motor driver 46 and a position sensor 48. The motor 44 is a reversible electric motor that receives electricity from the battery B. The motor driver 46 is a conventional circuit for controlling the motor 44. The position sensor 48 is an electro-mechanical device that converts the angular position of a shaft, axle, gear or other rotating part of the motor 44 to an analog or digital position signal that is sent to the microcomputer 40. The position sensor 48 is, for example, a rotary encoder that detects a rotation amount of an output shaft of the motor 44. Using feedback control based on the position signal from the position sensor 48, the microcomputer 40 sends an operating signal to the motor 44 for controlling the operation (rotation) of the motor 44.

Referring back to FIG. 3, the first bicycle component operating device OD1 includes three user inputs B1, B2 and B3, while the second bicycle component operating device OD2 includes three user inputs B4, B5 and B6. Here, the first and second bicycle component operating devices OD1 and OD2 are used to operate the bicycle electric components SP, FS, RS, FD and RD. Alternatively, each of the bicycle electric components SP, FS, RS, FD and RD can be provided with its own dedicated user operating device.

Here, for example, the interface 28 of the bicycle computer CC is configured to selectively assign each of the first and second bicycle component operating devices OD1 and OD2 to one of the bicycle electric components SP, FS. RS. FD and RD for selectively operating, adjusting and/or changing the bicycle components SP, FS, RS, FD and RD. In other words, the first and second bicycle component operating devices OD1 and OD2 can be set by the user or rider to operate, adjust and/or change one or more of the bicycle components SP, FS, RS, FD and RD. For example, the first and second bicycle component operating devices OD1 and OD2 can be set to normally operate the electric front derailleur FD and the electric rear derailleur RD, respectively. However, through one or more operations of the interface 28 of the bicycle computer CC, the user or rider can temporarily change the first and second bicycle component operating devices OD1 and OD2 such that they can operate, adjust and/or change the front suspension FS and the rear suspension RS, respectively. Likewise, the user or rider can temporarily change one of the first and second bicycle component operating devices OD1 and OD2 such that it can operate, adjust and/or change the height adjustable seatpost SP.

When second bicycle component operating device OD2 is assigned to operate the height adjustable seatpost SP, each of the user inputs B4, B5 and B6 is configured to output a particular input signal to the electronic controller 12. For example, if the inclination sensor 14 can be omitted and the user manually input the slope of the road (i.e., road condition), then the user input B4 outputs an input signal to the electronic controller 12 indicating an ascent condition, the user input B5 outputs an input signal to the electronic controller 12 indicating to a descent condition, and the user input B6 outputs an input signal to the electronic controller 12 indicating a flat or trail condition. Alternatively, when the electronic controller 12 is in a manual control mode, discussed later, the user inputs B4, B5 and B6 are configured to output the input signals to the electronic controller 12 for controlling the height adjustable seatpost SP to a prescribed seat height position. For example, in the manual control mode, the user input B4 outputs an input signal to the electronic controller 12 for controlling the height adjustable seatpost SP to a high seat position, the user input B5 outputs an input signal to the electronic controller 12 for controlling the height adjustable seatpost SP to a middle seat position, and the user input B6 outputs an input signal to the electronic controller 12 for controlling the height adjustable seatpost SP to a lower seat position.

Referring now to FIGS. 6 to 10, the storage device 22 of the electronic controller 12 has a plurality of correspondence tables stored therein for controlling an operating state of one or more of the bicycle electric components SP, FS, RS, FD and RD based on current riding conditions. For the front suspension FS and the rear suspension RS, a damping characteristic and a stroke length are the operating states that are adjusted by the electronic controller 12 based on the correspondence tables. Of course, one of the damping characteristic and the stroke length can be omitted from the correspondence table. In particular, in the correspondence tables, the damping characteristic of the front suspension FS and the rear suspension RS can be changed between lock (little to no damping), middle (partial damping), and open (full damping), while the stroke length can be changed between short and long. A lock state is a firm state as compared to an open state. For the height adjustable seatpost SP, a height of the height adjustable seatpost SP is an operating state that is adjusted by the electronic controller 12 based on the correspondence tables. In particular, the height of the height adjustable seatpost SP can be changed between a prescribed high height, and a prescribed low height. However, in addition to this, the height of the height adjustable seatpost SP can be changed to a prescribed middle height that is between the high height and the low height. For the gear transmission (e.g., the electric front derailleur FD and the electric rear derailleur RD), a gear ratio is an operating state that is adjusted by the electronic controller 12 based on the correspondence tables. In particular, the gear ratio can be changed between a low gear ratio and a middle/high gear ratio.

When the rider changes an operating state of one of the bicycle components SP. FS. RS, FD and RD and/or the slope of the road (i.e., road condition) changes, the electronic controller 12 changes the operating state of one or more of the bicycle components SP, FS, RS, FD and RD based on the correspondence table that has been selected. In other words, the electronic controller 12 is configured to output a control signal to operate both of a first bicycle electric component and a second bicycle electric component in accordance with a correspondence table between an operating state of the first bicycle electric component and an operating state of the second bicycle electric component. For example, the first bicycle electric component includes one of a height adjustable seatpost SP and a suspension FS and/or RS. The second bicycle electric component includes one of a gear transmission (e.g., the electric front and rear derailleurs FD and RD) and the other of the height adjustable seatpost SP and the suspension FS and/or RS.

In the illustrated embodiment, the electronic controller 12 outputs a control signal in response to receiving an input indicative of a road condition. In the illustrated embodiment, the electronic controller 12 is configured to receive the input via a manual input from a user. For example, the electronic controller 12 receives the manual input by the user operating one of the user inputs B1 to B6. Also, the electronic controller 12 is configured to receive the input from a road condition detector. For example, the electronic controller 12 receives the input from inclination sensor 14 (i.e., a road condition detector).

Thus, the bicycle component control system 10 simultaneously controls suitable operating states of multiple bicycle electric components via a single command. The single command can be a single user input (operating one of the user inputs B1 to B6) to change an operating state of one of the bicycle electric components SP, FS, RS, FD and RD. Also, the single command can be a signal from the inclination sensor 14 that the slope of the road has changed. Alternatively, the single command can be a single user input (operating one of the user inputs B1 to B6) to manually input the change in the slope of the road. In other words, the inclination sensor 14 can be omitted and the user can manually input using one of the first and second bicycle component operating devices OD1 and OD2. Here, in the correspondence tables of FIGS. 6 to 10, the riding condition is a road condition, and more particularly an inclination or slope of the road that the bicycle 1 is traveling on. Alternatively, or in addition to the inclination of the road condition, the riding condition can be other information detected by various detector or sensor. For example, the riding condition can include pedaling state, pedaling force, chain tension, velocity and/or acceleration of the bicycle, cadence (rotational speed of a crank), and so on.

In the case of the correspondence tables of FIGS. 6 and 7, the riding condition further includes a current gear ratio of the electric front derailleur FD and the electric rear derailleur RD. The correspondence tables of FIGS. 6 and 7 are selected by the user when the user wants to control the damping and the stroke of the front suspension FS and/or the rear suspension RS as well as the height adjustable seatpost SP based on both road slope and gear ratio of the transmission.

In particular, in FIG. 6, a first (high gear ratio) correspondence table is shown that the electronic controller 12 uses to set operating states of the front suspension FS and/or the rear suspension RS (first bicycle electric components) and the height adjustable seatpost SP (second bicycle electric component) for a particular road condition when a gear ratio of the gear transmission (e.g., the electric front and rear derailleurs FD and RD) is more than a prescribed gear ratio. On the other hand, in FIG. 7, a second (low gear ratio) correspondence table is shown that the electronic controller 12 uses to set operating states of the front suspension FS and/or the rear suspension RS (first bicycle electric components) and the height adjustable seatpost SP (second bicycle electric component) for a particular road condition when a gear ratio of the gear transmission (e.g., the electric front and rear derailleurs FD and RD) is equal to or less than the prescribed gear ratio.

Accordingly, in the correspondence tables of FIGS. 6 and 7, the first bicycle electric component includes the suspensions FS and/or RS, and the second bicycle electric component includes the height adjustable seatpost SP. Also, in the correspondence tables of FIGS. 6 and 7, the correspondence table includes at least one of a travel stroke and a damping condition of the suspension, and a plurality of height positions of the height adjustable seatpost SP. When using the correspondence tables of FIGS. 6 and 7, the control signal includes a first control signal to control the first bicycle electric component and a second control signal to control the first bicycle electric component.

For example, in the correspondence tables of FIGS. 6 and 7, the electronic controller 12 is configured to output the control signal to change the damping condition of the suspensions FS and/or RS to be firm state and to change the height position of the height adjustable seatpost SP to a high position in response to receiving the input indicative of an ascending road condition. In other words, when the bicycle 1 is ascending, the height position of the height adjustable seatpost SP is changed to a high position and the suspensions FS and/or RS are placed in a lock state (firm state). In addition to this, when the bicycle 1 is ascending, the travel stroke is changed to short.

On the other hand, for example, the electronic controller 12 is configured to output the control signal to change the damping condition of the suspension to be open state and to change the height position of the height adjustable seatpost SP to a low position in response to receiving the input indicative of a descending road condition. In other words, when the bicycle 1 is descending, the height position of the height adjustable seatpost SP is changed to a low position and the suspensions FS and/or RS are placed in an open state (soft state). In addition to this, when the bicycle 1 is descending, the travel stroke is changed to long.

Also, for example, the electronic controller 12 is configured to output the control signal to change the damping condition of the suspension to be open state and to change the height position of the height adjustable scatpost SP to a high position in response to receiving the input indicative of a flat or trail condition while the gear transmission is in a high gear ratio. In other words, when the bicycle 1 is traveling on a flat road or a trail in which the slope does not exceed a prescribed inclination upwardly or downwardly with respect to horizontal while the gear transmission is in a high gear ratio, the height position of the height adjustable seatpost SP is changed to a high position and the suspensions FS and/or RS are placed in an open state (soft state). In addition to this, when the bicycle 1 is flat or trail condition, the travel stroke is changed to long.

On the other hand, for example, the electronic controller 12 is configured to output the control signal to change the damping condition of the suspension to be a middle state and to change the height position of the height adjustable seatpost SP to a high position in response to receiving the input indicative of a flat or trail condition while the gear transmission is in a low gear ratio. In other words, when the bicycle 1 is traveling on a flat road or a trail in which the slope does not exceed a prescribed inclination upwardly or downwardly with respect to horizontal while the gear transmission is in a low gear ratio, the height position of the height adjustable scatpost SP is changed to a heigh position and the suspensions FS and/or RS are placed in a middle state (soft state). In addition to this, when the bicycle 1 is flat or trail condition, the travel stroke is changed to short.

The correspondence table of FIG. 8 is selected by the user when the user wants to control the damping and the stroke of the front suspension FS and/or the rear suspension RS as well as the gear ratio of the transmission based on road slope. In particular, in FIG. 8, a third (all-purpose) correspondence table is shown that the electronic controller 12 uses to set operating states of the front suspension FS and/or the rear suspension RS (first bicycle electric components) and the electric front derailleur FD and/or the electric rear derailleur RD (second bicycle electric components) for a particular road condition.

On the other hand, the correspondence table of FIG. 9 is selected by the user when the user wants to control the height of the height adjustable seatpost SP as well as the gear ratio of the transmission based on road slope. In particular, in FIG. 9, a fourth (all-purpose) correspondence table is shown that the electronic controller 12 uses to set operating states of the height adjustable seatpost SP (first bicycle electric component) and the electric front derailleur FD and/or the electric rear derailleur RD (second bicycle electric components) for a particular road condition.

The correspondence table of FIG. 10 is selected by the user when the user wants to control the damping and the stroke of the front suspension FS and/or the rear suspension RS, the height of the height adjustable seatpost SP as well as the gear ratio of the transmission based on road slope. In particular, in FIG. 10, a fifth (all-purpose) correspondence table is shown that the electronic controller 12 uses to set operating states of the front suspension FS and/or the rear suspension RS (first bicycle electric components), the height adjustable seatpost SP (second bicycle electric component), and the electric front derailleur FD and/or the electric rear derailleur RD (third bicycle electric components) for a particular road condition.

Figure 11:
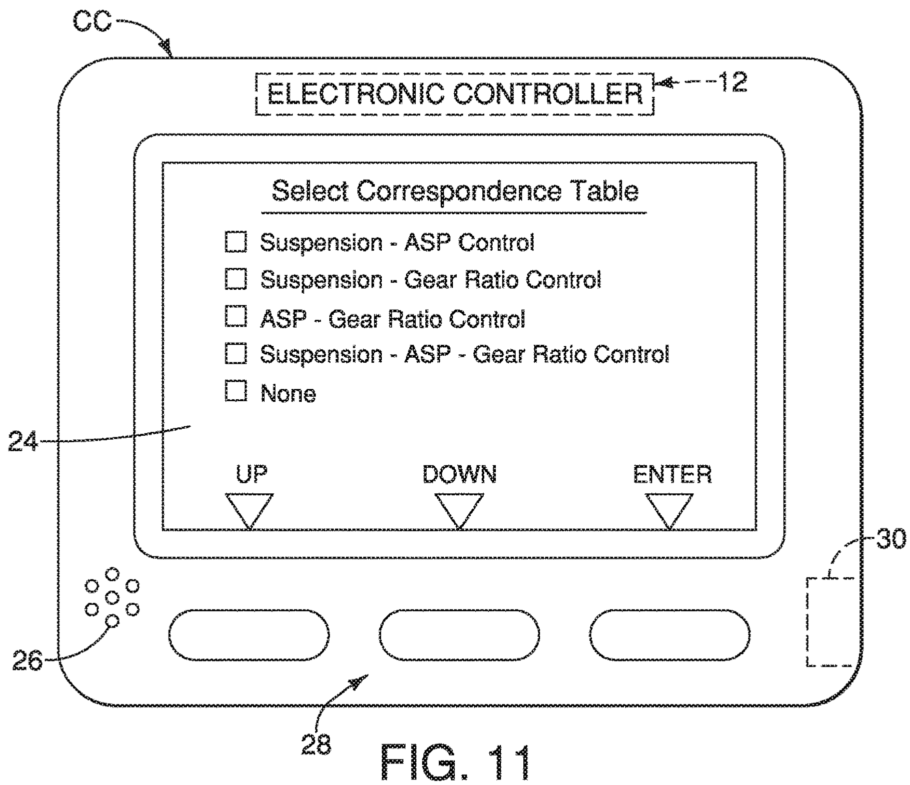
FIG. 11 is a front view of the bicycle computer displaying a screen (i.e., a setting mode screen) for a rider or other user to select the correspondence table(s) to be used during riding.
Figure 12:
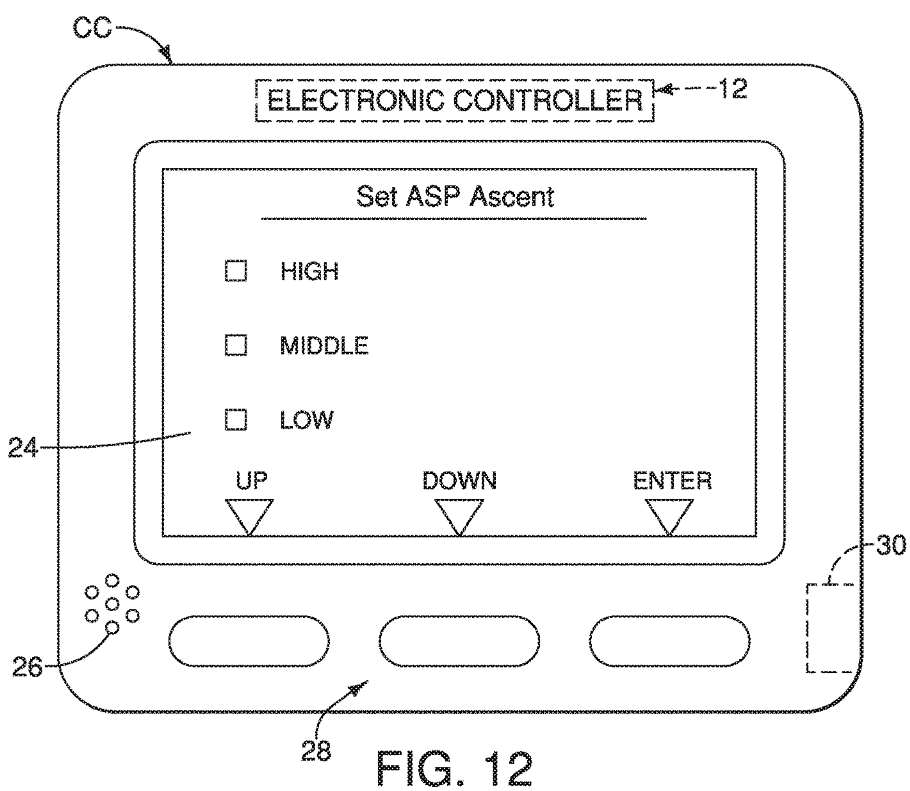
FIG. 12 is a front view of the bicycle computer displaying a screen (i.e., a setting mode screen) for a rider or other user to select a seat height for riding in an ascending road for the correspondence tables of FIGS. 6 and 7.

Referring to FIGS. 11 and 12, the electronic controller 12 is configured to set a setting mode in which a user can select the correspondence table(s) and set the various operating states for the bicycle electric components of the correspondence table. The setting mode can be omitted, and the electronic controller 12 can include only one default corresponding table. In the illustrated embodiment, the electronic controller 12 uses the display 24 to display various screens for the user to set various parameters for controlling the bicycle electric components SP, FS, RS, FD and RD. In this way, a user can select which of the correspondence tables will be used during riding as well as set user preferences for each of the settings of the bicycle electric components in the selected correspondence table. For example, a user can enter a setting mode using the interface 26 of the bicycle computer CC and/or the user inputs B1 to B6 of the first and second bicycle component operating devices OD1 and OD2.

As seen in FIG. 11, the bicycle computer CC displays a correspondence table selection screen (i.e., a setting mode screen) for a user to select the correspondence table(s) to be used during riding. When one of the correspondence tables is selected, the electronic controller 12 is in a multiple device control mode. Alternatively, the user can select none of the correspondence tables, and manually operate each of the bicycle components SP, FS, RS, FD and RD individually. When none of the correspondence tables are selected, the electronic controller 12 is in a manual control mode. In other words, the electronic controller 12 is configured to set a multiple device control mode in which the electronic controller 12 outputs the least one control signal in accordance with the correspondence table, and a manual control mode in which the electronic controller 12 outputs a control signal in response to a separate input to control one of the bicycle telescopic apparatus and the first bicycle electric component.

Once the correspondence table(s) is selected, the bicycle computer CC displays a series on setting mode screens one after another for a user to change each of the settings of the selected correspondence table(s). For example one of the setting mode screens is shown in FIG. 12. In the FIG. 12, the user is given the opportunity to select a seat height for riding in an ascending road for the correspondence tables of FIGS. 6 and 7. Although not shown, for the sake of brevity, each of the settings of each of the selected correspondence tables can be changed by the user. In this way, the electronic controller 12 is configured to set a setting mode in which a user can set at least one setting of the correspondence table.

Figure 13:
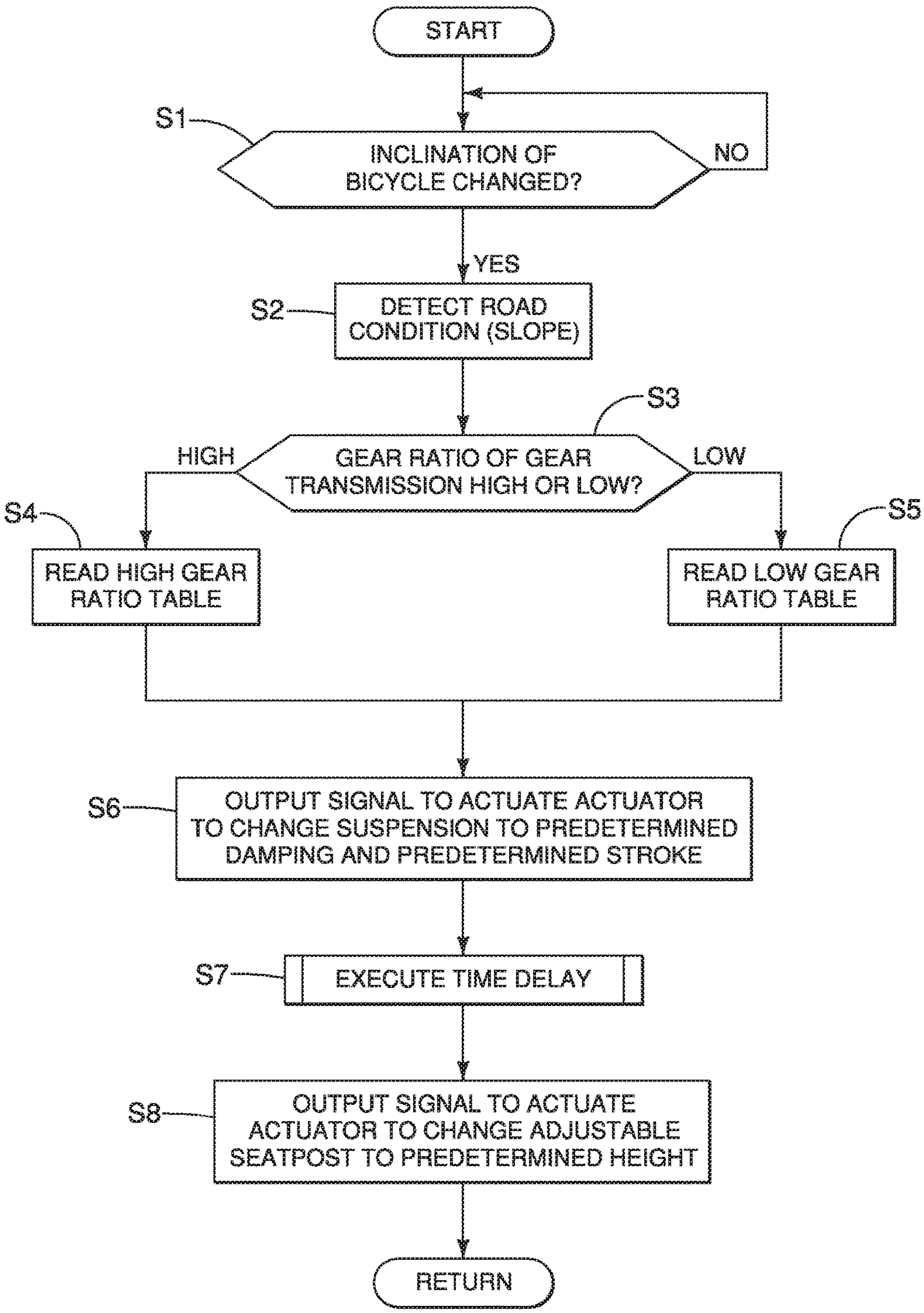
FIG. 13 is a first flowchart showing a first control process executed by an electronic controller of the bicycle component control system for controlling a first bicycle electric component and a second bicycle electric component for a particular road condition.
Figure 14:
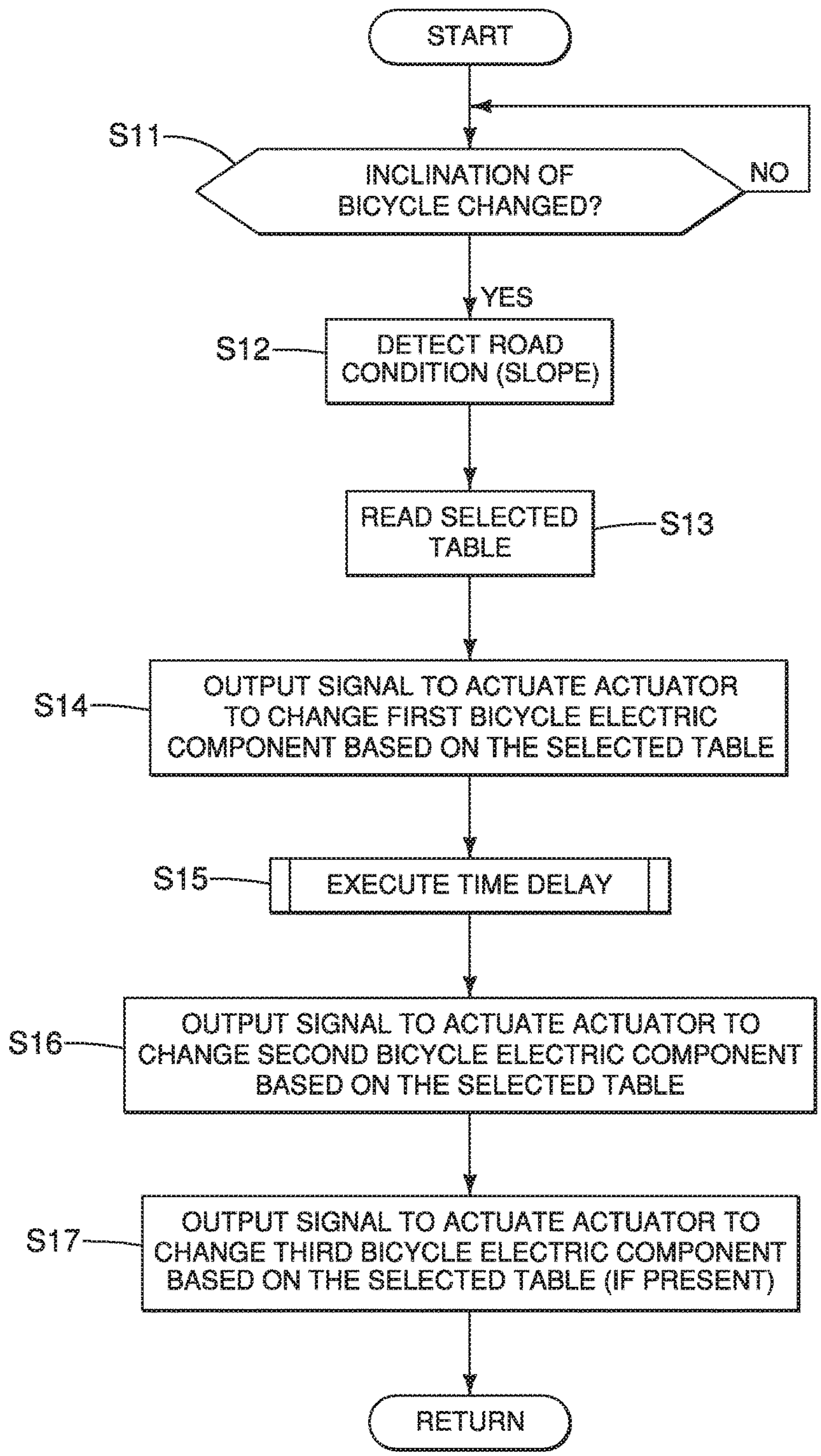
FIG. 14 is a second flowchart showing a second control process executed by the electronic controller of the bicycle component control system for controlling a first bicycle electric component, a second bicycle electric component and a third bicycle electric component for a particular road condition.

FIGS. 13 and 14 illustrate several control programs that are stored in the storage device 22 of the electronic controller 12. The user can select which one of the control programs will be used for any particular riding condition. Using the user interface 28, the user can select whether the electronic controller 12 will execute the control program of FIG. 13 or the control program of FIG. 14 as well as which the correspondence tables of FIGS. 6 to 10 will be used. If one of the control programs of FIGS. 13 and 14 is selected, then the electronic controller 12 will execute the process of the selected control program at a prescribed interval.

Referring to FIG. 13, a first flowchart for a first control process that is executed by the electronic controller 14 is illustrated. Here, the electronic controller 12 controls a first bicycle electric component and a second bicycle electric component for a particular road condition using the correspondence tables of FIGS. 6 and 7. Here, the electronic controller 12 is configured to change the correspondence table to control the first bicycle electric component and the second bicycle electric component in accordance with a current gear ratio at a time of receiving the input. In this first control process, the first bicycle electric component is at least one of the front and rear suspensions FS and RS, while the second bicycle electric component is the height adjustable seatpost SP.

In step S1, the electronic controller 12 is programmed to determine if the inclination or slope of the bicycle 1 has changed. If the slope of the bicycle 1 has not changed, then the electronic controller 12 repeats step S1 to continuously check the inclination or slope of the bicycle 1 at a prescribed interval. The change in the inclination or slope of the bicycle 1 is checked using the inclination sensor 14. If the slope of the bicycle 1 has changed, then the control process proceeds to step S2.

In step S2, the electronic controller 12 is programmed to detect the inclination or slope of the bicycle 1 using the inclination sensor 14. In particular, the electronic controller 12 is configured to determine if the slope of the road that the bicycle 1 is traveling on is ascending, descending or flat (trail). The electronic controller 12 determines the slope of the road is ascending, when the bicycle 1 is inclined greater than a first prescribed inclination for a prescribed period of time. The electronic controller 12 determines the slope of the road is descending, when the bicycle 1 is inclined lower than a second prescribed inclination for a prescribed period of time. The electronic controller 12 determines the slope of the road is flat or a trail, when the bicycle 1 has an inclination that is within a prescribed inclination range that is less than or equal to the prescribed inclination and larger than or equal to the second prescribed inclination. The electronic controller 12 stores the detected road condition as ascent, descent or trail (flat) in the storage device 22 of the electronic controller 12.

In step S3, the electronic controller 12 is programmed to determine if the gear ratio of the gear transmission (e.g., the electric front and rear derailleurs FD and RD) is more than a prescribed gear ratio or less than or equal to the prescribed gear ratio. If the gear ratio of the gear transmission (e.g., the electric front and rear derailleurs FD and RD) is more than the prescribed gear ratio, then the control process proceeds to step S4. If the gear ratio of the gear transmission (e.g., the electric front and rear derailleurs FD and RD) is less than or equal to the prescribed gear ratio then the control process proceeds to step S5.

In step S4, the electronic controller 12 reads the correspondence table of FIG. 6 from the storage device 22, and then the control process proceeds to step S6.

In step S5, the electronic controller 12 reads the correspondence table of FIG. 7 from the storage device 22, and then the control process proceeds to step S6.

In step S6, the electronic controller 12 is programmed to output a first control signal to actuate an actuator (e.g., the motor 44 in the front suspension FS and/or the rear suspension RS) to change the damping characteristics (e.g., lock, open or middle) and the stroke (e.g., short or long) of the front suspension FS and/or the rear suspension RS to a predetermined damping and a predetermined stroke in the correspondence table of FIG. 6 or FIG. 7 based on the detected road condition detected in step S2.

In step S7, the electronic controller 12 is programmed to execute a time delay so that the damping characteristics and the stroke of the front suspension FS and/or the rear suspension RS can be completely adjusted to the predetermined height before proceeding to step S8.

In step S8, the electronic controller 12 is programmed to output a second control signal to actuate an actuator (e.g., the motor 44 in the height adjustable scatpost SP) to change the height of the height adjustable seatpost SP to a predetermined height in the correspondence table of FIG. 6 or FIG. 7 based on the detected road condition detected in step S2. After step S8, the control process returns back to step S1.

When using the correspondence tables of FIGS. 6 and 7 in the first control process of FIG. 13, the control signal includes a first control signal (e.g., step S6) to control the first bicycle electric component and a second control signal (e.g., step S8) to control the second bicycle electric component, and the electronic controller 12 is configured to output the first control signal and the second control signal with a time lag therebetween. In the first control process of the first flowchart of FIG. 13, the steps S6 and S8 can be switched and/or step S7 can be omitted.

Referring to now FIG. 14, a second flowchart for a second control process is illustrated that is executed by the electronic controller 12. Here, the electronic controller 12 controls a first bicycle electric component and a second bicycle electric component for a particular road condition using one of the correspondence tables of FIGS. 8 to 10. In this second control process, the first bicycle electric component is either at least one of the front and rear suspensions FS and RS or the height adjustable seatpost SP, while the second bicycle electric component is either the height adjustable seatpost SP or the gear transmission (e.g., the electric front and rear derailleurs FD and RD). In the case of using the correspondence table of FIG. 10 with this second control process, the first bicycle electric component is either at least one of the front and rear suspensions FS and RS, the second bicycle electric component is the height adjustable seatpost SP, and the third bicycle electric component is the gear transmission (e.g., the electric front and/or rear derailleurs FD and/or RD).

In this second control process of FIG. 14, steps S11 and S12 are the same as steps S11 and S12 of the first control process of FIG. 13. Thus, the descriptions of steps S11 and S12 will not be repeated again.

In step S13, the electronic controller 12 reads one of the correspondence tables of FIGS. 8 to 10 from the storage device 22, and then the control process proceeds to step S14.

In step S14, the electronic controller 12 is programmed to actuate an actuator (e.g., the motor 44 of the first bicycle electric component) to change the first bicycle electric component based on the correspondence table that was selected by the user and the detected road condition detected in step S12.

In step S15, the electronic controller 12 is programmed to execute a time delay so that change the first bicycle electric component can be completed before proceeding to step S16. Step S15 can be inserted between step 16 and 17, and/or step 15 can be omitted from the second control process of FIG. 14.

In step S16, the electronic controller 12 is programmed to actuate an actuator (e.g., the motor 44 of the second bicycle electric component) to change the second bicycle electric component based on the correspondence table that was selected by the user and the detected road condition detected in step S12.

In step S17, the electronic controller 12 is programmed to actuate an actuator (e.g., the motor 44 of the third bicycle electric component) to change the third bicycle electric component based on the correspondence table of FIG. 10 and the detected road condition detected in step S12. In other words, when the correspondence table of FIG. 10 is selected, the electronic controller 12 is configured to output the least one control signal to operate the height adjustable seatpost SP, the suspension and the gear transmission in accordance with the correspondence table. If the correspondence table of FIG. 10 is not selected, then the process skips step S17 and returns back to step S11.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side". "non-frame facing side", "forward", "rearward", "front", "rear", "up", "down", "above", "below", "upward", "downward", "top", "bottom". "side", "vertical", "horizontal", "perpendicular" and "transverse" as well as any other similar directional terms refer to those directions of a bicycle in an upright, riding position and equipped with the bicycle component control system. Accordingly, these directional terms, as utilized to describe the bicycle component control system should be interpreted relative to a bicycle in an upright riding position on a horizontal surface and that is equipped with the bicycle component control system. The terms "left" and "right" are used to indicate the "right" when referencing from the right side as viewed from the rear of the bicycle, and the "left" when referencing from the left side as viewed from the rear of the bicycle.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle component control system comprising:

an electronic controller being configured to output a control signal to operate both of a first bicycle electric component and a second bicycle electric component in accordance with a correspondence table between an operating state of the first bicycle electric component and an operating state of the second bicycle electric component, the first bicycle electric component including one of a height adjustable seatpost and a suspension, and the second bicycle electric component includes one of a gear transmission and the other of the height adjustable seatpost and the suspension.

2. The bicycle component control system according to claim 1, wherein the first bicycle electric component includes the suspension and the second bicycle electric component includes the height adjustable seatpost, and the correspondence table includes at least one of a travel stroke and a damping condition of the suspension, and a plurality of height positions of the height adjustable seatpost.

3. The bicycle component control system according to claim 2, wherein the electronic controller outputs the control signal in response to receiving an input indicative of a road condition.

4. The bicycle component control system according to claim 3, wherein the electronic controller is configured to receive the input via a manual input from a user.

5. The bicycle component control system according to claim 3, wherein the electronic controller is configured to receive the input from a road condition detector.

6. The bicycle component control system according to claim 3, wherein the electronic controller is configured to output the control signal to change the height position of the height adjustable scatpost to a high position and to change the damping condition of the suspension to be firm state in response to receiving the input indicative of an ascending road condition.

7. The bicycle component control system according to claim 3, wherein the electronic controller is configured to output the control signal to change the height position of the height adjustable seatpost to a low position and to change the damping condition of the suspension to be open state in response to receiving the input indicative of a descending road condition.

8. The bicycle component control system according to claim 1, wherein the electronic controller is configured to change the correspondence table to control the first bicycle electric component and the second bicycle electric component in accordance with a current gear ratio at a time of receiving the input.

9. The bicycle component control system according to claim 1, wherein the electronic controller is configured to output the least one control signal to operate the height adjustable seatpost, the suspension and the gear transmission in accordance with the correspondence table.

10. The bicycle component control system according to claim 1, wherein the electronic controller is configured to set a multiple device control mode in which the electronic controller outputs the least one control signal in accordance with the correspondence table and a manual control mode in which the electronic controller outputs a control signal in response to a separate input to control one of the bicycle telescopic apparatus and the first bicycle electric component.

11. The bicycle component control system according to claim 1, wherein the control signal includes a first control signal to control the first bicycle electric component and a second control signal to control the second bicycle electric component, and the electronic controller is configured to output the first control signal and the second control signal with a time lag therebetween.

12. The bicycle component control system according to claim 1, wherein the electronic controller is configured to set a setting mode in which a user can set at least one setting of the correspondence table.

13. The bicycle component control system according to claim 1, wherein the electronic controller is configured to output the control signal via a wireless transmitter.

* * * * *